(12) United States Patent
Maxim et al.

(10) Patent No.: US 10,742,253 B2
(45) Date of Patent: Aug. 11, 2020

(54) RADIO FREQUENCY FRONT-END APPARATUS

(71) Applicant: Qorvo US, Inc., Greensboro, NC (US)

(72) Inventors: George Maxim, Saratoga, CA (US); Dirk Robert Walter Leipold, San Jose, CA (US); Wolfram C. Stiebler, Munich (DE)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 16/119,328

(22) Filed: Aug. 31, 2018

(65) Prior Publication Data
US 2019/0393923 A1 Dec. 26, 2019

Related U.S. Application Data (60) Provisional application No. 62/688,639, filed on Jun. 22, 2018.

(51) Int. Cl.
*H04B 1/48* (2006.01)

(52) U.S. Cl.
CPC ......... *H04B 1/48* (2013.01); *H04B 2001/485* (2013.01)

(58) Field of Classification Search
CPC ...... H04B 1/48; H04B 1/18; H04B 2001/485; H04M 1/6058; H04W 4/12
See application file for complete search history.

(56) References Cited

U.S. PATENT DOCUMENTS

| | | | |
|---|---|---|---|
| 2010/0202325 A1* | 8/2010 | Poulin | H04B 1/006 370/280 |
| 2011/0165849 A1* | 7/2011 | Gorbachov | H04B 1/18 455/84 |
| 2013/0005275 A1* | 1/2013 | Nicolson | H04B 1/48 455/73 |
| 2017/0187510 A1* | 6/2017 | van Liempd | H03H 7/40 |

* cited by examiner

*Primary Examiner* — Tuan H Nguyen
(74) *Attorney, Agent, or Firm* — Withrow & Terranova, P.L.L.C.

(57) ABSTRACT

A radio frequency (RF) front-end apparatus is provided. In examples discussed herein, the RF front-end apparatus can be configured to communicate RF signals in millimeter wave (mmWave) RF frequencies (e.g., ≥12 GHz). The RF front-end apparatus includes an RF front-end circuit and an antenna element. The RF front-end circuit includes a transmit path and a receive path for transmitting and receiving RF signals, respectively. The antenna element includes an input port(s) and an output port(s) that are coupled to the transmit path and the receive path, respectively. The antenna element can be configured to enable impedance matching between the input port(s) and the transmit path, as well as between the output port(s) and the receive path. As a result, it may be possible to reduce insertion losses in the RF front-end circuit, thus helping to improve performance of the RF front-end apparatus, particularly in support of mmWave communications.

20 Claims, 7 Drawing Sheets

RADIO FREQUENCY FRONT-END APPARATUS

RELATED APPLICATIONS

This application claims the benefit of provisional patent application Ser. No. 62/688,639, filed Jun. 22, 2018, the disclosure of which is hereby incorporated herein by reference in its entirety.

FIELD OF THE DISCLOSURE

The technology of the disclosure relates generally to a radio frequency (RF) front-end circuit(s).

BACKGROUND

Mobile communication devices have become increasingly common in current society for providing wireless communication services. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

A mobile communication device includes a radio frequency (RF) front-end module(s) (FEM(s)) configured to transmit an outgoing RF signal(s) and receive an incoming RF signal(s). The RF FEM is coupled to an antenna port(s) in an antenna element(s) that is configured to radiate the outgoing RF signal(s) into a wireless communication medium and absorb the incoming RF signal(s) from the wireless communication medium. In a conventional third-generation (3G)/fourth-generation (4G) mobile communication device, the RF FEM(s) is typically separated from the antenna element(s) and coupled to the antenna module(s) via an interconnect medium(s) (e.g., a conductive flex). Notably, the antenna port(s) inherently presents load impedance (e.g., 50Ω) to the RF FEM. As such, the RF FEM often employs an impedance matching circuit(s) to ensure proper impedance matching, but at the expense of added insertion losses.

In contrast to the conventional 3G/4G mobile communication device, a fifth-generation new radio (5G-NR) mobile communication device can be configured to transmit a millimeter wave (mmWave) RF signal(s) in an mmWave band(s) located above 12 GHz frequency. Notably, the mmWave RF signal(s) can be susceptible to attenuation and interference resulting from various sources. For example, the mmWave RF signal(s) can be attenuated due to insertion loss associated with the interconnect medium. As such, an mmWave FEM(s) is typically provided in close proximity (e.g., ≤100 micrometers) from an mmWave antenna element (s) (e.g., an antenna array) that radiates an outgoing mmWave RF signal(s) and absorbs an incoming mmWave RF signal(s). In some cases, the mmWave FEM(s) may even be integrated with the mmWave antenna element(s) to form an integrated FEM. In this regard, it may be desirable to take advantage of the close coupling between the mmWave FEM(s) and the mmWave antenna element(s) to help mitigate insertion losses resulting from the impedance matching circuit(s).

SUMMARY

Embodiments of the disclosure relate to a radio frequency (RF) front-end apparatus. In examples discussed herein, the RF front-end apparatus can be configured to communicate RF signals in millimeter wave (mmWave) RF frequencies (e.g., ≥12 GHz). The RF front-end apparatus includes an RF front-end circuit and an antenna element. The RF front-end circuit includes a transmit path and a receive path for transmitting and receiving RF signals, respectively. The antenna element includes an input port(s) and an output port(s) that are coupled to the transmit path and the receive path, respectively. The antenna element can be configured to enable impedance matching between the input port(s) and the transmit path, as well as between the output port(s) and the receive path. As a result, it may be possible to reduce insertion losses in the RF front-end circuit, thus helping to improve performance of the RF front-end apparatus, particularly in support of mmWave communications.

In one aspect, an RF front-end apparatus is provided. The RF front-end apparatus includes an antenna element. The antenna element includes at least one transmit port corresponding to a first load impedance. The antenna element also includes at least one receive port corresponding to a second load impedance different from the first load impedance. The RF front-end apparatus also includes an RF front-end circuit. The RF front-end circuit includes a transmit path coupled to the at least one transmit port to transmit an RF transmit signal. The RF front-end circuit also includes a receive path coupled to the at least one receive port to receive an RF receive signal. The antenna element is configured to cause the first load impedance at the transmit port to substantially match an inherent transmit impedance of the transmit path. The antenna element is also configured to cause the second load impedance at the receive port to substantially match an inherent receive impedance of the receive path.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure relate to a radio frequency (RF) front-end apparatus. In examples discussed herein, the RF front-end apparatus can be configured to communicate RF signals in millimeter wave (mmWave) RF frequencies (e.g., ≥12 GHz). The RF front-end apparatus includes an RF front-end circuit and an antenna element. The RF front-end circuit includes a transmit path and a receive path for transmitting and receiving RF signals, respectively. The antenna element includes an input port(s) and an output port(s) that are coupled to the transmit path and the receive path, respectively. The antenna element can be configured to enable impedance matching between the input port(s) and the transmit path, as well as between the output port(s) and the receive path. As a result, it may be possible to reduce insertion losses in the RF front-end circuit, thus helping to improve performance of the RF front-end apparatus, particularly in support of mmWave communications.

Figure 1:
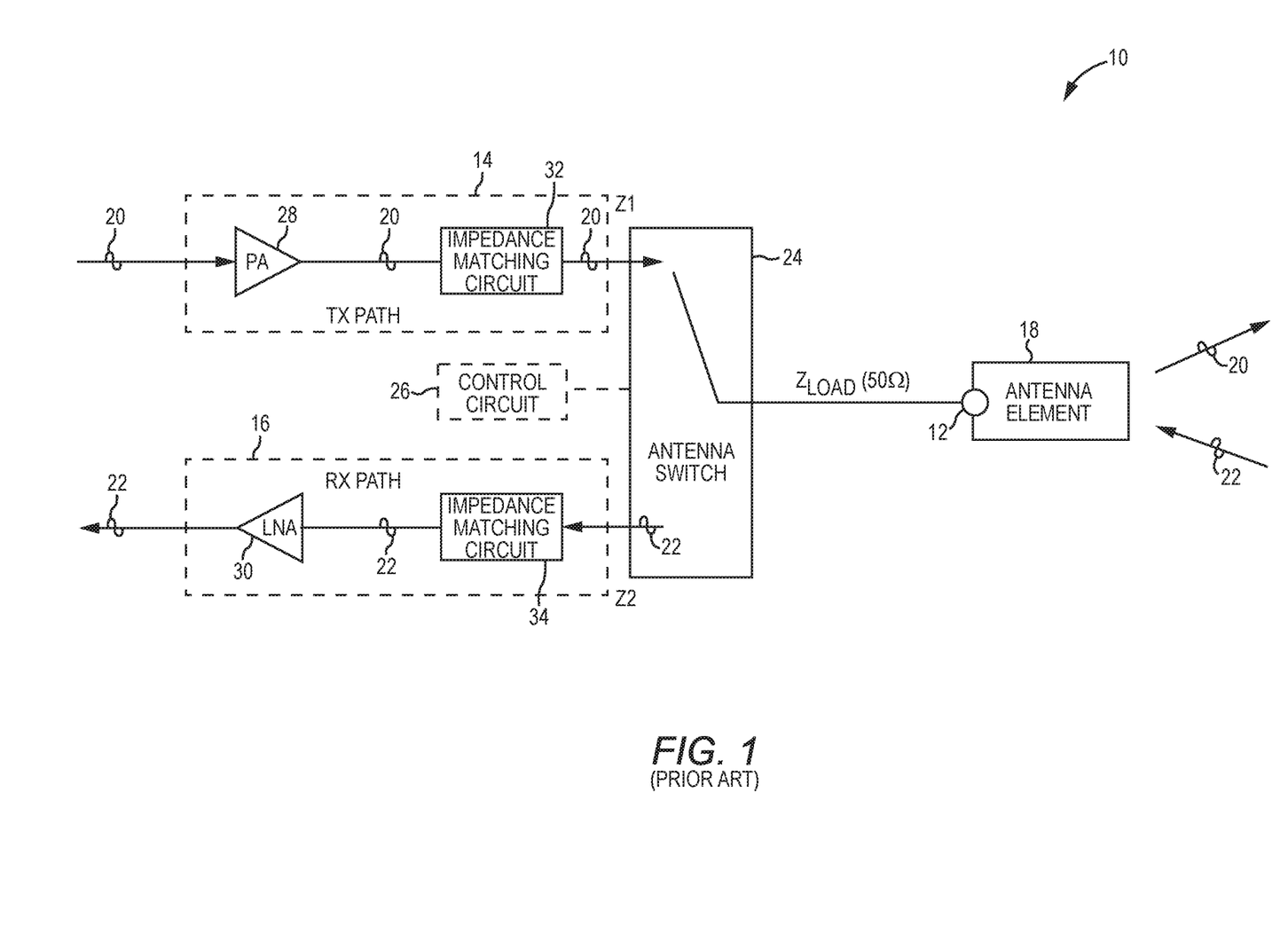
FIG. 1 is a schematic diagram of a conventional radio frequency (RF) front-end apparatus that can suffer additional insertion losses as a result of sharing a common antenna port between a transmit path and a receive path.

Before discussing the RF front-end apparatus of the present disclosure, a brief overview of a conventional RF front-end apparatus is first provided with reference to FIG. 1 to help understand issues related to sharing a common antenna port between a transmit path and a receive path. The discussion of specific exemplary aspects of an RF front-end apparatus according to the present disclosure starts below with reference to FIG. 2.

In this regard, FIG. 1 is a schematic diagram of a conventional RF front-end apparatus 10 that can suffer additional insertion losses as a result of sharing a common antenna port 12 between a transmit path 14 and a receive path 16. The common antenna port 12 is coupled to an antenna element 18 configured to radiate an RF transmit signal 20 and absorb an RF receive signal 22.

The conventional RF front-end apparatus 10 includes an antenna switch 24, which may be controlled by a control circuit 26 to alternately couple the common antenna port 12 to the transmit path 14 or the receive path 16. Accordingly, the transmit path 14 and the receive path 16 can transmit the RF transmit signal 20 and receive the RF receive signal 22 via the common antenna port 12, respectively. In a non-limiting example, the control circuit 26 can alternately couple the common antenna port 12 to the transmit path 14 or the receive path 16 based on a time-division duplexing (TDD) scheme.

The transmit path 14 includes a power amplifier 28 configured to amplify the RF transmit signal 20 prior to transmitting the RF transmit signal 20 via the common antenna port 12. The receive path 16 includes a low-noise amplifier (LNA) 30 configured to amplify the RF receive signal 22 received via the common antenna port 12. The transmit path 14 has an inherent first impedance Z1, which is primarily determined by an inherent output impedance of the power amplifier 28. The receive path 16, on the other hand, has an inherent second impedance Z2, which is primarily determined by an inherent optimal noise impedance of the LNA 30.

The antenna element 18 presents an inherent load impedance $Z_{LOAD}$ at the common antenna port 12. In a non-limiting example, the load impedance $Z_{LOAD}$ is typically 50

Ohms (Ω). However, the inherent output impedance of the power amplifier 28, which determines the first impedance $Z_1$ of the transmit path 14, is typically lower than the load impedance $Z_{LOAD}$, thus causing an impedance mismatch between the transmit path 14 and the common antenna port 12. Similarly, the inherent optimal noise impedance of the LNA 30, which determines the second impedance $Z_2$ of the receive path 16, is typically higher than the load impedance $Z_{LOAD}$, thus causing an impedance mismatch between the receive path 16 and the common antenna port 12. Such impedance mismatches may cause signal reflections in the transmit path 14 and/or the receive path 16 to significantly reduce respective signal-to-noise ratio (SNR) of the RF transmit signal 20 and/or the RF receive signal 22 and, consequently, compromise RF performance of the conventional RF front-end apparatus 10.

In this regard, the transmit path 14 and the receive path 16 may be configured to include a transmit impedance matching circuit 32 and a receive impedance matching circuit 34, respectively. The transmit impedance matching circuit 32 can be so configured to match the first impedance $Z_1$ with the load impedance $Z_{LOAD}$. Likewise, the receive impedance matching circuit 34 can be so configured to match the second impedance $Z_2$ with the load impedance $Z_{LOAD}$. By matching the first impedance $Z_1$ and the second impedance $Z_2$ with the load impedance $Z_{LOAD}$, it may be possible to reduce signal reflections in the transmit path 14 and the receive path 16.

However, the transmit impedance matching circuit 32 and the receive impedance matching circuit 34 may cause additional insertion losses in the transmit path 14 and the receive path 16, respectively. In addition, the antenna switch 24 can also increase the insertion losses in the conventional RF front-end apparatus 10. Given that the additional insertion losses may weaken the respective SNR of the RF transmit signal 20 and the RF receive signal 22, it may be desirable to match the first impedance $Z_1$ and the second impedance $Z_2$ with the load impedance $Z_{LOAD}$, respectively, without employing the transmit impedance matching circuit 32 and the receive impedance matching circuit 34.

Figure 2:
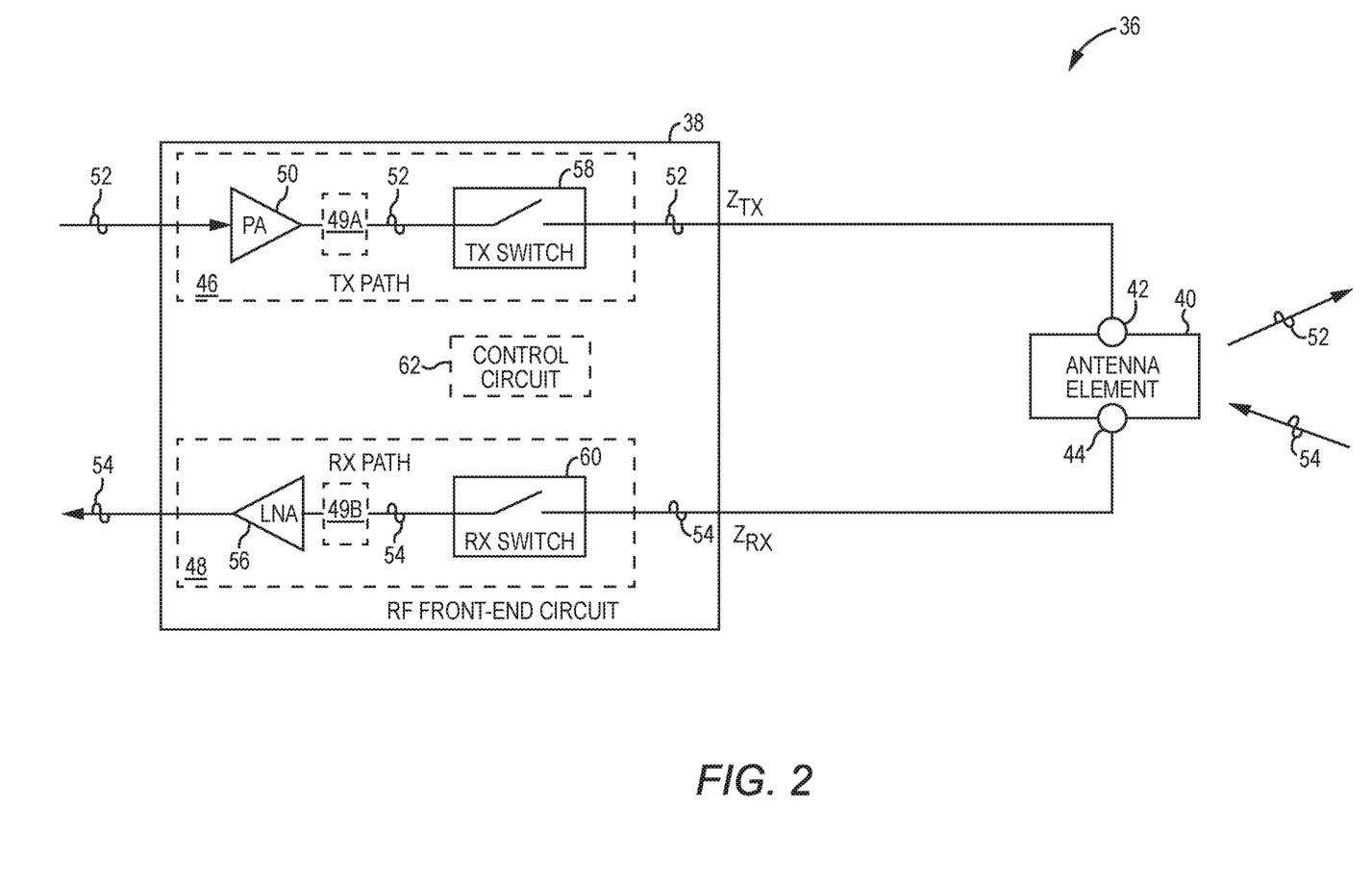
FIG. 2 is a schematic diagram of an RF front-end apparatus configured according to one embodiment of the present disclosure to enable impedance matching between an RF front-end circuit and an antenna element.

In this regard, FIG. 2 is a schematic diagram of an RF front-end apparatus 36 configured according one embodiment of the present disclosure to enable impedance matching between an RF front-end circuit 38 and an antenna element 40. The antenna element 40 includes at least one transmit port 42 and at least one receive port 44 configured to be coupled to a transmit path 46 and a receive path 48 in the RF front-end circuit 38, respectively.

As discussed in detail below, the antenna element 40 is so configured to cause a first load impedance $Z_{TX}$ at the transmit port 42 and a second load impedance $Z_{RX}$ at the receive port 44 to substantially match inherent impedances of the transmit path 46 and the receive path 48, respectively. In a non-limiting example, the first load impedance $Z_{TX}$ is considered to substantially match the inherent impedance of the transmit path 46 when the first load impedance $Z_{TX}$ is less than three times the impedance of the transmit path 46. Likewise, the second load impedance $Z_{RX}$ is considered to substantially match the inherent impedance of the receive path 48 when the second load impedance $Z_{RX}$ is less than three times the impedance of the receive path 48.

By matching the impedances at the transmit port 42 and the receive port 44 to the respective inherent impedances of the transmit path 46 and receive path 48, it may be possible to employ low loss matching circuits 49A, 49B (e.g., <0.2 dB insertion loss) or completely eliminate matching circuits in the transmit path 46 and the receive path 48. As a result, it may be possible to reduce insertion losses in the RF front-end circuit 38, thus helping to improve performance of the RF front-end apparatus 36, particularly in support of mmWave communications.

The transmit path 46 includes a power amplifier 50 configured to amplify an RF transmit signal 52. The transmit path 46 is configured to provide the RF transmit signal 52 to the transmit port 42 such that the antenna element can radiate the RF transmit signal 52 in, for example, an mmWave transmit band.

The antenna element 40 is configured to absorb an RF receive signal 54 in, for example, an mmWave receive band and provide the RF receive signal 54 to the receive path 48. The receive path 48 includes a low-noise amplifier (LNA) 56 configured to amplify the RF receive signal 54.

The transmit path 46 may include transmit switch circuitry 58. The transmit switch circuitry 58 can be configured to couple the transmit path 46 to the transmit port 42 or decouple the transmit path 46 from the transmit port 42. The receive path 48 may include receive switch circuitry 60. The receive switch circuitry 60 can be configured to couple the receive path 48 to the receive port 44 or decouple the receive path 48 from the receive port 44. The transmit switch circuitry 58 and the receive switch circuitry 60 may be controlled by a control circuit 62 based on a TDD scheme.

In a non-limiting example, the inherent impedances of the transmit path 46 and the receive path 48 can be determined primarily by inherent impedances of the power amplifier 50 and the LNA 56, respectively. The inherent impedance of the power amplifier 50 (e.g., 12-25Ω) is typically smaller than the inherent impedance of the LNA 56 (e.g., 100-200Ω). In this regard, the antenna element 40 is configured to cause the second load impedance $Z_{RX}$ at the receive port 44 to be greater than the first load impedance $Z_{TX}$ at the transmit port 42. As a result, the antenna element 40 may be able to independently match the inherent impedances of the transmit path 46 and the receive path 48 with requiring impedance matching circuits being provided in the transmit path 46 and the receive path 48. As a result, the RF front-end apparatus 36 may have improved RF performance over the conventional RF front-end apparatus 10 of FIG. 1.

The antenna element 40 may be configured to include a variety of antennas, such as three-dimensional (3D) patch antenna, planar patch antenna, multi-patch antenna, slot antenna, multi-slot antenna, broadband antenna using cut-outs, broadband antenna using slots, hybrid slot and patch antenna structure, and so on. It should be appreciated that the fundamental principle of configuring the antenna element 40 to individually match the inherent impedances of the transmit path 46 and the receive path 48 can be implemented with any type of antennas.

Figure 3A:
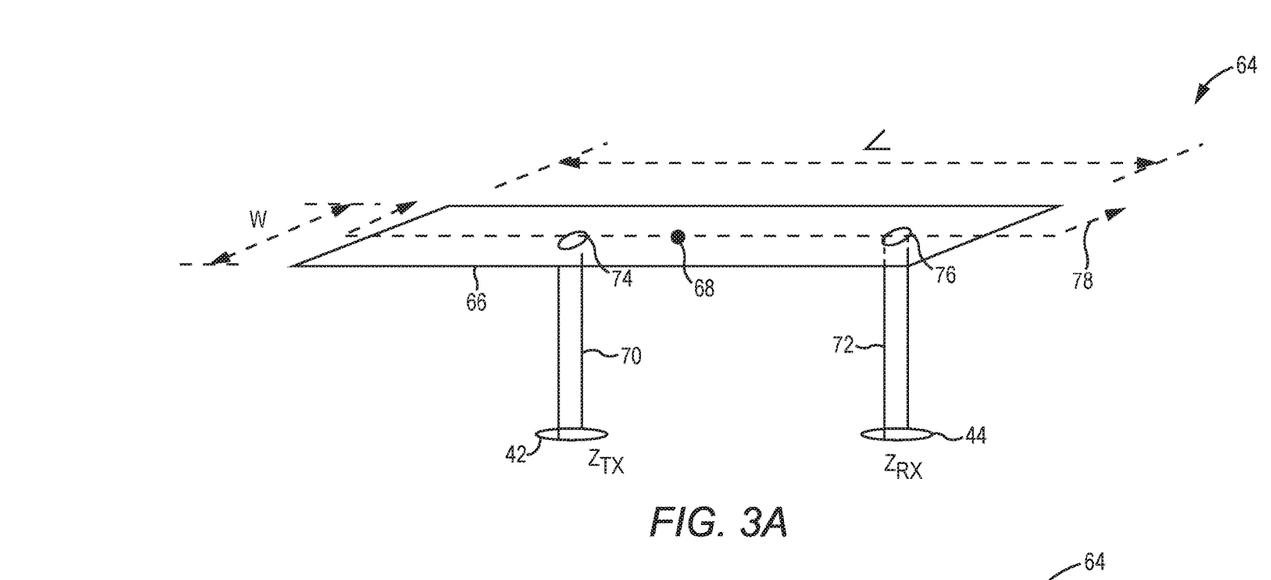
FIGS. 3A-3B are schematic diagrams of an exemplary three-dimensional (3D) patch antenna that can be provided in an antenna element in the RF front-end apparatus of FIG. 2.
Figure 3B:
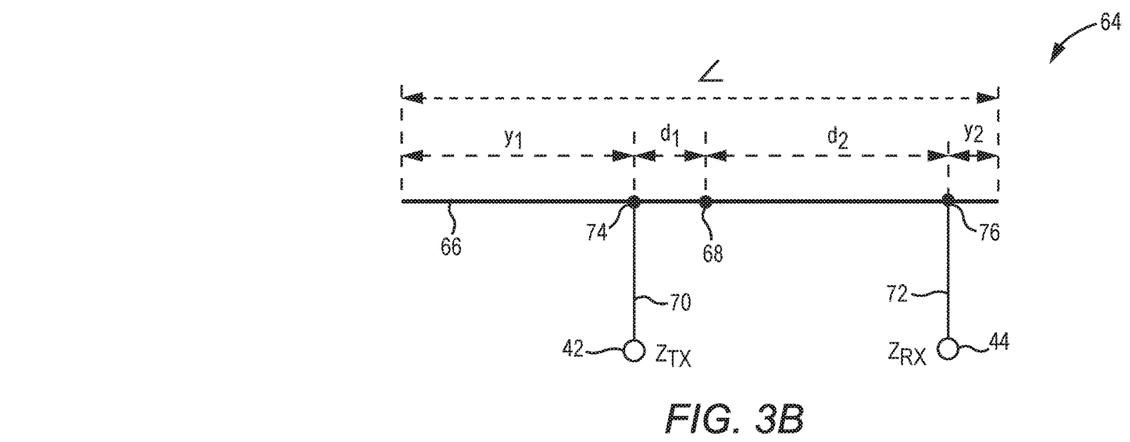

In one embodiment, the antenna element 40 can be configured to include a 3D patch antenna. In this regard, FIGS. 3A-3B are schematic diagrams of an exemplary 3D patch antenna 64 that can be provided in the antenna element 40 of FIG. 2. Common elements between FIGS. 2, 3A, and 3B are shown therein with common element numbers and will not be re-described herein.

FIG. 3A provides a 3D view of the 3D patch antenna 64. The 3D patch antenna 64 includes a patch 66 in a defined geometric plane shape (e.g., rectangular, square, circular, pentagon, hexagon, etc.) that corresponds to a defined geometric center 68. In a non-limiting example, the patch 66 can be a rectangular-shaped patch having a defined width W and a defined length L. The 3D patch antenna 64 includes a first conductive structure 70 and a second conductive structure 72. The first conductive structure 70 extends perpendicularly from a first tap point 74 on the patch 66 to the transmit port 42. The second conductive structure 72 extends perpendicularly from a second tap point 76 on the patch 66 to the receive port 44. In this regard, both the first conductive structure 70 and the second conductive structure 72 are perpendicular to the patch 66. In a non-limiting example, the first tap point 74, the defined geometric center 68, and the second tap point 76 are located on a cross-section line 78, which is a straight line.

FIG. 3B is a cross-section view of the 3D patch antenna 64 of FIG. 3A along the cross-section line 78. The first tap point 74 is separated from the defined geometric center 68 by a first distance $d_1$ and the second tap point 76 is separated from the defined geometric center 68 by a second distance $d_2$. In a non-limiting example, the first load impedance $Z_{TX}$ and the second load impedance $Z_{RX}$ that the 3D patch antenna 64 presents at the transmit port 42 and the receive port 44 can be proportionally related to the first distance $d_1$ and the second distance $d_2$, respectively. In this regard, the farther away a conductive structure, such as the first conductive structure 70 or the second conductive structure 72, is placed from the defined geometric center 68, the greater the load impedance the conductive structure can produce. Accordingly, the second distance $d_2$ is configured to be greater than the first distance $d_1$, thus allowing the second load impedance $Z_{RX}$ to be greater than the first load impedance $Z_{TX}$. An exemplary correlation between load impedance and a normalized distance $d_N$ can be summarized in Table 1 below.

TABLE 1

| Normalized Distance ($d_N$) | Load Impedance (Ω) |
| --- | --- |
| 0.00 | 0 |
| 0.25 | 35 |
| 0.35 | 72 |
| 0.50 | 105 |
| 0.67 | 123 |
| 1.00 | 144 |

In a non-limiting example, the normalized distance $d_N$ can be determined based on the following equation (Eq. 1).

$$d_N = (2*d)/L \quad \text{(Eq. 1)}$$

In the equation (Eq. 1) above, d represents a separation distance from the defined geometric center 68, such as the first distance $d_1$ or the second distance $d_2$, while L corresponds to the defined length of the patch 66. Given that the normalized distance $d_N$ is proportionally related to the separation distance d, it can be said that the first load impedance $Z_{TX}$ and the second load impedance $Z_{RX}$ are proportionally related to the normalized distance $d_N$.

Alternatively, another normalized distance $d'_N$ can also be determined based on the equation (Eq. 2) below.

$$d'_N = (2*y)/L = 2*(\tfrac{1}{2}L - d)/L \quad \text{(Eq. 2)}$$

In the equation (Eq. 2) above, y represents a distance to an edge of the patch 66, which is inversely related to the distance from the defined geometric center 68 ($y = \tfrac{1}{2}L - d$). In this regard, the first load impedance $Z_{TX}$ and the second load impedance $Z_{RX}$ are inversely related to the normalized distance $d'_N$, as summarized in Table 2 below. In other words, the closer a conductive structure, such as the first conductive structure 70 or the second conductive structure 72, is placed toward the edge of the patch 66, the greater the load impedance the conductive structure can produce.

TABLE 2

| Normalized Distance ($d'_N$) | Load Impedance (Ω) |
| --- | --- |
| 0.00 | 144 |
| 0.25 | 123 |
| 0.35 | 105 |
| 0.50 | 72 |
| 0.67 | 35 |
| 1.00 | 0 |

Figure 4:
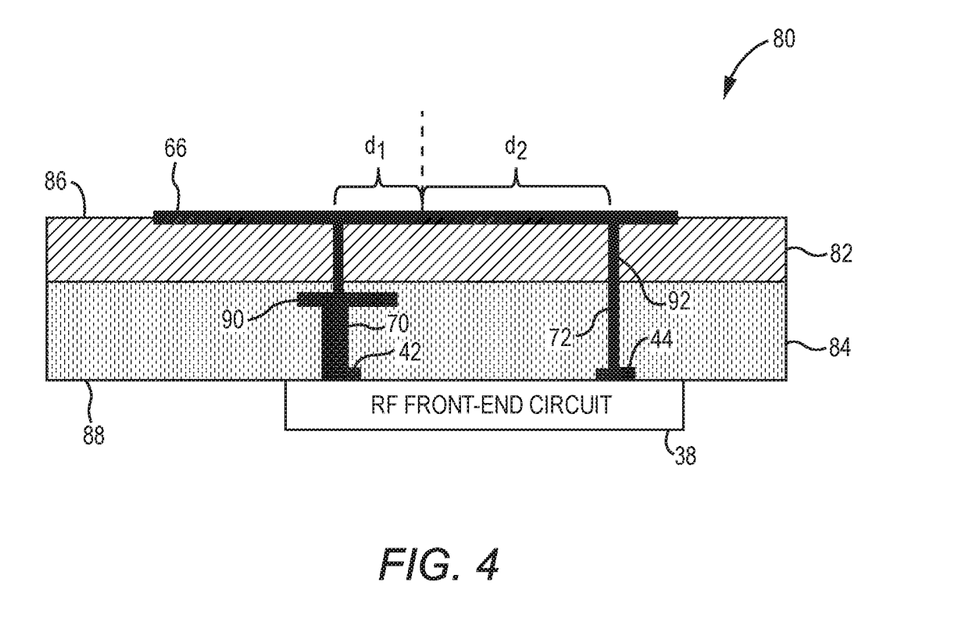
FIG. 4 is a schematic diagram of an exemplary 3D structure fabricated to incorporate the 3D patch antenna of FIGS. 3A-3B.

The 3D patch antenna 64 of FIGS. 3A-3B can be provided in a 3D structure. In this regard, FIG. 4 is a schematic diagram of an exemplary 3D structure 80 fabricated to incorporate the 3D patch antenna 64 of FIGS. 3A-3B. Common elements between FIGS. 2, 3A, 3B, and 4 are shown therein with common element numbers and will not be re-described herein.

The 3D structure 80 includes a first layer 82 and a second layer 84. The second layer 84 is disposed underneath the first layer 82 and in parallel to the first layer 82. In a non-limiting example, the patch 66 is provided on a top surface 86 of the first layer 82 and the RF front-end circuit 38 is provided on a bottom surface 88 of the second layer 84. The RF front-end circuit 38 is conductively coupled to the transmit port 42 and the receive port 44.

The first conductive structure 70 is conductively coupled between the patch 66 and the transmit port 42 by extending perpendicularly from the top surface 86 to the bottom surface 88. Likewise, the second conductive structure 72 is conductively coupled between the patch 66 and the receive port 44 by extending perpendicularly from the top surface 86 to the bottom surface 88. In a non-limiting example, the first conductive structure 70 can extend from the patch 66 to the transmit port 42 through a conductive pad 90 and the second conductive structure 72 can extend from the patch 66 to the receive port 44 through a conductive via 92.

Figure 5A:
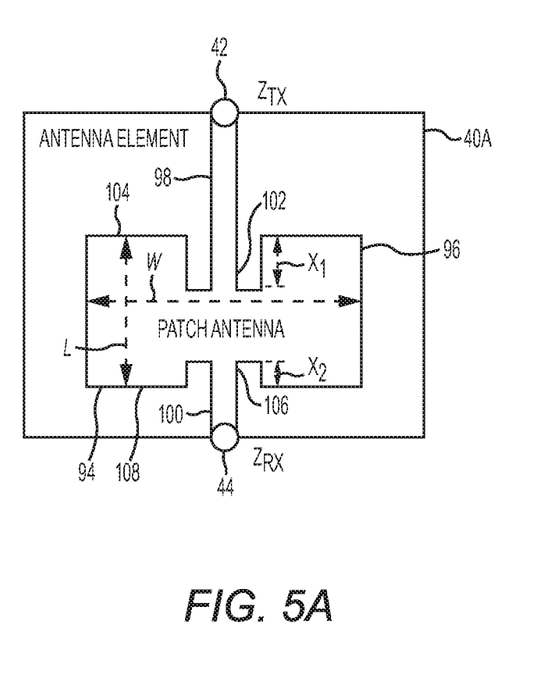
FIG. 5A is a schematic diagram of an exemplary antenna element including a planar patch antenna configured according to one embodiment of the present disclosure.

In one embodiment, the antenna element 40 can be configured to include a planar patch antenna. In this regard, FIG. 5A is a schematic diagram of an exemplary antenna element 40A including a planar patch antenna 94 configured according to one embodiment of the present disclosure. Common elements between FIGS. 2 and 5A are shown therein with common element numbers and will not be re-described herein. The antenna element 40A can be provided in the RF front-end apparatus 36 of FIG. 2 as the antenna element 40.

The planar patch antenna 94 includes a patch 96 in a defined geometric plane shape (e.g., rectangular, square, circular, pentagon, hexagon, etc.). In a non-limiting example, the patch 96 can be a rectangular-shaped patch having a defined width W and a defined length L. The planar patch antenna 94 includes a first notch 98 and a second notch 100. The first notch 98 extends from a first inset feed point 102 on an edge 104 of the patch 96 to the transmit port 42. The second notch 100 extends from a second inset feed point 106 on an opposing edge 108 of the patch 96 to the receive port 44.

The first notch 98 corresponds to a first normalized inset length $L_{N1}$ and the second notch 100 corresponds to a second normalized inset length $L_{N2}$, which can be determined respectively based on the equations (Eq. 3.1 and Eq. 3.2) below.

$$LN_1 = 2*x_1/L \quad \text{(Eq. 3.1)}$$

$$LN_2 = 2*x_2/L \quad \text{(Eq. 3.2)}$$

In the equations above, $x_1$ represents a first inset length from the first inset feed point 102 to the edge 104 and $x_2$ represents a second inset length from the second inset feed point 106 to the opposing edge 108. In a non-limiting example, the first load impedance $Z_{TX}$ and the second load impedance $Z_{RX}$ can be inversely related to the first normalized inset length $L_{N1}$ and the second normalized inset length $L_{N2}$, respectively. In this regard, the higher the normalized inset length is, the higher the corresponding load impedance can be. Accordingly, the first normalized inset length $L_{N1}$ of the first notch 98 is configured to be greater than the second normalized inset length $L_{N2}$ of the second notch 100 such that the second load impedance $Z_{RX}$ can be greater than the first load impedance $Z_{TX}$. An exemplary correlation between load impedance and a normalized inset length $L_N$ can be summarized in Table 3 on the next page.

TABLE 3

| Normalized Inset Length ($L_N$) | Load Impedance (Ω) |
|---|---|
| 0.00 | 166.93 |
| 0.25 | 107.53 |
| 0.35 | 91.46 |
| 0.50 | 41.27 |
| 0.67 | 13.57 |
| 1.00 | 9.94 |

Figure 5B:
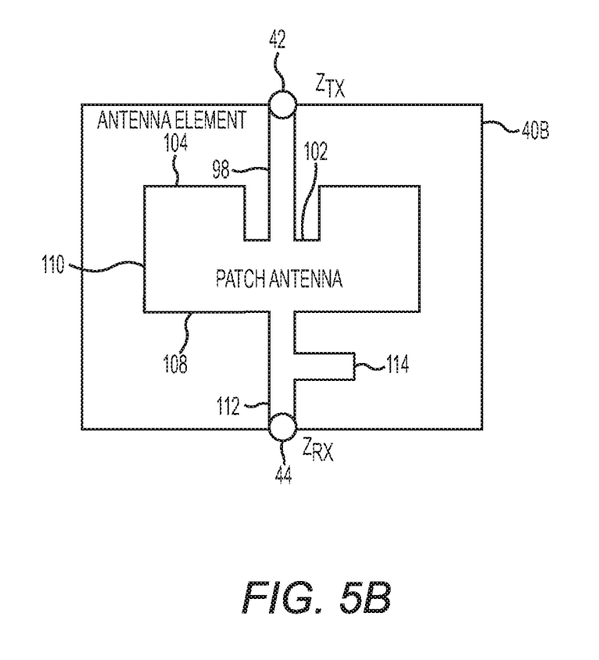
FIG. 5B is a schematic diagram of an exemplary antenna element including a planar patch antenna configured according to another embodiment of the present disclosure.

FIG. 5B is a schematic diagram of an exemplary antenna element 40B including a planar patch antenna 110 configured according to another embodiment of the present disclosure. Common elements between FIGS. 2, 5A, and 5B are shown therein with common element numbers and will not be re-described herein. The antenna element 40B can be provided in the RF front-end apparatus 36 of FIG. 2 as the antenna element 40.

The antenna element 40B includes the first notch 98 and a second notch 112. In contrast to the second notch 100 in the planar patch antenna 94 of FIG. 5A, the second notch 112 is configured to extend from the opposing edge 108 to the receive port 44. The second notch 112 is conductively coupled to a stub structure 114, which can be configured to increase the second load impedance $Z_{RX}$ to as high as 300Ω.

Notably, it may be possible to design the antenna element 40 to include both perpendicular and coplanar tap points. Accordingly, it may be possible to implement the antenna element 40 by combining the antenna element 40A and the antenna element 40B.

Figure 6:
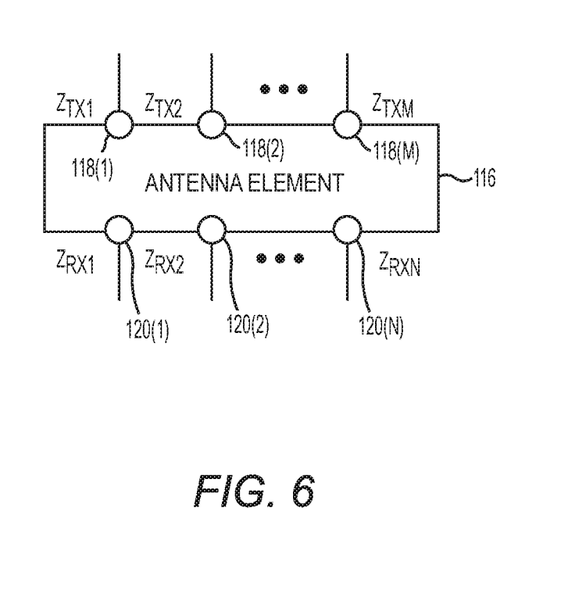
FIG. 6 is a schematic diagram of an exemplary antenna element configured to include a number of transmit ports and a number of receive ports.

The antenna element 40 in the RF front-end apparatus 36 of FIG. 2 can be configured to include multiple transmit ports and/or multiple receive ports. In this regard, FIG. 6 is a schematic diagram of an exemplary antenna element 116 configured to include a number of transmit ports 118(1)-118(M) and a number of receive ports 120(1)-120(N).

The transmit ports 118(1)-118(M) are configured to present a number of first load impedances $Z_{TX1}$-$Z_{TXM}$, respectively. The receive ports 120(1)-120(N) are configured to present a number of second load impedances $Z_{RX1}$-$Z_{RXN}$, respectively. The antenna element 116 may be configured to include an equal number of transmit ports and receive ports. The antenna element may also be configured to include a different number of transmit ports and receive ports.

The antenna element 116 can be configured to include the 3D patch antenna 64 of FIGS. 3A-3B, the planar patch antenna 94 of FIG. 5A, or the planar patch antenna 110 of FIG. 5B. It should also be appreciated that the antenna element 116 can also be configured to include a mixture of different types of antennas, such as a 3D patch antenna, planar patch antenna, multi-patch antenna, slot antenna, multi-slot antenna, broadband antenna using cutouts, broadband antenna using slots, hybrid slot and patch antenna structure, and so on.

The antenna element 116 may be provided in the RF front-end apparatus 36 of FIG. 2 as the antenna element 40. In this regard, the transmit path 46 can be coupled to a selected transmit port among the transmit ports 118(1)-118(M) and the receive path 48 can be coupled to a selected receive port among the receive ports 120(1)-120(N). Notably, the above discussed techniques can also be applied to multi-band antennas and different tap points can be used for each band or group of bands.

It should be further appreciated that the RF front-end apparatus 36 of FIG. 2 can be configured to include additional RF front-end circuits and/or additional antenna elements. These additional RF front-end circuits and the additional antenna elements can be configured to operate based on the configuration and operation principles as described above in FIGS. 2-6.

Those skilled in the art will recognize improvements and modifications to the preferred embodiments of the present disclosure. All such improvements and modifications are considered within the scope of the concepts disclosed herein and the claims that follow.

What is claimed is:

1. A radio frequency (RF) front-end apparatus comprising:
    an antenna element configured to radiate an RF transmit signal and absorb an RF receive signal and comprising:
        at least one transmit port corresponding to a first load impedance; and
        at least one receive port corresponding to a second load impedance different from the first load impedance; and
    an RF front-end circuit comprising:
        a transmit path comprising a power amplifier and transmit switch circuitry, the transmit path configured to provide the RF transmit signal to the at least one transmit port; and
        a receive path comprising a low-noise amplifier (LNA) and receive switch circuitry, the receive path configured to receive the RF receive signal from the at least one receive port;
    wherein the antenna element is configured to:
        cause the first load impedance at the at least one transmit port to substantially match an inherent transmit impedance of the transmit path without a transmit impedance matching circuit between the power amplifier and the at least one transmit port; and
        cause the second load impedance at the at least one receive port to substantially match an inherent receive impedance of the receive path.

2. The RF front-end apparatus of claim 1 wherein the second load impedance is greater than the first load impedance.

3. The RF front-end apparatus of claim 1 wherein the antenna element is further configured to:
    cause the first load impedance to be less than two times the inherent transmit impedance; and
    cause the second load impedance to be less than two times the inherent receive impedance.

4. The RF front-end apparatus of claim 1 wherein:
    the power amplifier is configured to amplify the RF transmit signal; and the transmit switch circuitry is configured to couple the transmit path to the at least one transmit port or decouple the transmit path from the at least one transmit port.

5. The RF front-end apparatus of claim 4 wherein the transmit path does not include the transmit impedance matching circuit between the power amplifier and the at least one transmit port.

6. The RF front-end apparatus of claim 4 wherein the first load impedance is less than two times an inherent output impedance of the power amplifier.

7. The RF front-end apparatus of claim 1 wherein:
the LNA is configured to amplify the RF receive signal; and
the receive switch circuitry is configured to couple the receive path to the at least one receive port or decouple the receive path from the at least one receive port.

8. The RF front-end apparatus of claim 7 wherein the receive path does not include a receive impedance matching circuit between the LNA and the at least one receive port.

9. The RF front-end apparatus of claim 7 wherein the second load impedance is less than two times an inherent optimal noise impedance of the LNA.

10. The RF front-end apparatus of claim 1 wherein the antenna element comprises an antenna selected from the group consisting of: a three-dimensional (3D) patch antenna, a planar patch antenna, a multi-patch antenna, a slot antenna, a multi-slot antenna, a broadband antenna using cutouts, a broadband antenna using slots, and a hybrid slot and patch antenna structure.

11. The RF front-end apparatus of claim 1 wherein the antenna element comprises a three-dimensional (3D) patch antenna, the 3D patch antenna comprising:
a patch in a defined geometric plane shape having a defined geometric center;
a first conductive structure extending perpendicularly from a first tap point on the patch to the at least one transmit port, the first tap point being separated from the defined geometric center by a first distance; and
a second conductive structure extending perpendicularly from a second tap point on the patch to the at least one receive port, the second tap point being separated from the defined geometric center by a second distance.

12. The RF front-end apparatus of claim 11 wherein:
the first load impedance at the at least one transmit port is proportionally related to the first distance; and
the second load impedance at the at least one receive port is proportionally related to the second distance.

13. The RF front-end apparatus of claim 11 wherein the second distance is greater than the first distance.

14. The RF front-end apparatus of claim 11 wherein the defined geometric center, the first tap point, and the second tap point are allocated on a straight line on the patch.

15. The RF front-end apparatus of claim 11 provided in a 3D structure comprising a first layer and a second layer disposed underneath and in parallel to the first layer, wherein:

the patch is disposed on a top surface of the first layer;
the RF front-end circuit is disposed on a bottom surface of the second layer; and
the first conductive structure and the second conductive structure extend perpendicularly from the top surface of the first layer to the bottom surface of the second layer.

16. The RF front-end apparatus of claim 1 wherein the antenna element comprises a planar patch antenna and the planar patch antenna comprises:
a patch in a defined geometric plane shape;
a first notch having a first normalized inset length and coupled between the patch and the at least one transmit port; and
a second notch having a second normalized inset length and coupled between the patch and the at least one receive port.

17. The RF front-end apparatus of claim 16 wherein:
the patch is a rectangular-shaped patch having a defined width and a defined length;
the first notch extends from a first inset feed point on an edge of the rectangular-shaped patch to the at least one transmit port and corresponds to the first normalized inset length; and
the second notch extends from a second inset feed point on an opposing edge of the rectangular-shaped patch to the at least one receive port and corresponds to the second normalized inset length that is smaller than the first normalized inset length.

18. The RF front-end apparatus of claim 17 wherein:
the first load impedance at the at least one transmit port is inversely related to the first normalized inset length; and
the second load impedance at the at least one receive port is inversely related to the second normalized inset length.

19. The RF front-end apparatus of claim 16 wherein:
the patch is a rectangular-shaped patch having a defined width and a defined length;
the first notch extends from a first inset feed point on an edge of the rectangular-shaped patch to the at least one transmit port and corresponds to the first normalized inset length; and
the second notch extends from an opposing edge of the rectangular-shaped patch to the at least one receive port, wherein the second notch is conductively coupled to a stub structure configured to increase the second load impedance at the at least one receive port.

20. The RF front-end apparatus of claim 1 wherein:
the at least one transmit port comprises a plurality of transmit ports corresponding to a plurality of first load impedances, respectively; and
the at least one receive port comprises a plurality of receive ports corresponding to a plurality of second load impedances, respectively.

* * * * *

UNITED STATES PATENT AND TRADEMARK OFFICE
CERTIFICATE OF CORRECTION

PATENT NO. : 10,742,253 B2
APPLICATION NO. : 16/119328
DATED : August 11, 2020
INVENTOR(S) : George Maxim et al.

Page 1 of 1

It is certified that error appears in the above-identified patent and that said Letters Patent is hereby corrected as shown below:

In the Specification

Column 6, Line 7, replace "such that the antenna element can" with --such that the antenna element 40 can--.
Column 6, Line 63, replace "a defined width Wand" with --a defined width W and--.
Column 8, Line 51, replace "a defined width Wand" with --a defined width W and--.

Signed and Sealed this
Sixth Day of October, 2020

Andrei Iancu
*Director of the United States Patent and Trademark Office*